Oct. 1, 1963   H. S. DIFFEE   3,105,305
VERNIER CALIBRATED ANGLE AND DISTANCE LAYOUT INSTRUMENT
Filed June 24, 1960

INVENTOR.
HENRY S. DIFFEE
BY
ATTORNEY

United States Patent Office 3,105,305
Patented Oct. 1, 1963

3,105,305
VERNIER CALIBRATED ANGLE AND DISTANCE LAYOUT INSTRUMENT
Henry S. Diffee, 7587 Quivas St., Denver, Colo.
Filed June 24, 1960, Ser. No. 38,601
5 Claims. (Cl. 33—189)

The present invention relates to a vernier calibrated angle and distance layout instrument of a type that would be useful in machine work to establish and locate drill holes, turn centers and similar points of reference.

The main purpose and object of this invention is to provide an instrument of maximum usefulness and accuracy that is specifically adapted for measuring distances and angles to locate points of reference in machine work with a high degree of accuracy.

A further object of this invention is to provide a layout instrument which can be used to establish a base line of reference together with points thereon at specified distances apart and which further may be used to locate other and additional work points with respect to such base line and with respect to other locations made therefrom.

Another object of this invention is to provide a layout instrument which is useful to locate and mark points of reference or drill centers at any angle with respect to an initial reference base and to further locate points along such angle at prescribed distances away from the apex of the angle.

A further object of this invention is to provide vernier calibrations so that distances accurate to one-thousandth of an inch and angles accurate to two minutes are possible.

A still further object of this invention is to provide lock and retainer means for holding all of the separate parts of the vernier layout instrument in accurately adjusted positions so that the results may be duplicated without error when desired. Specific mechanisms for locking, holding and establishing centers and work points are provided.

Figure 1:
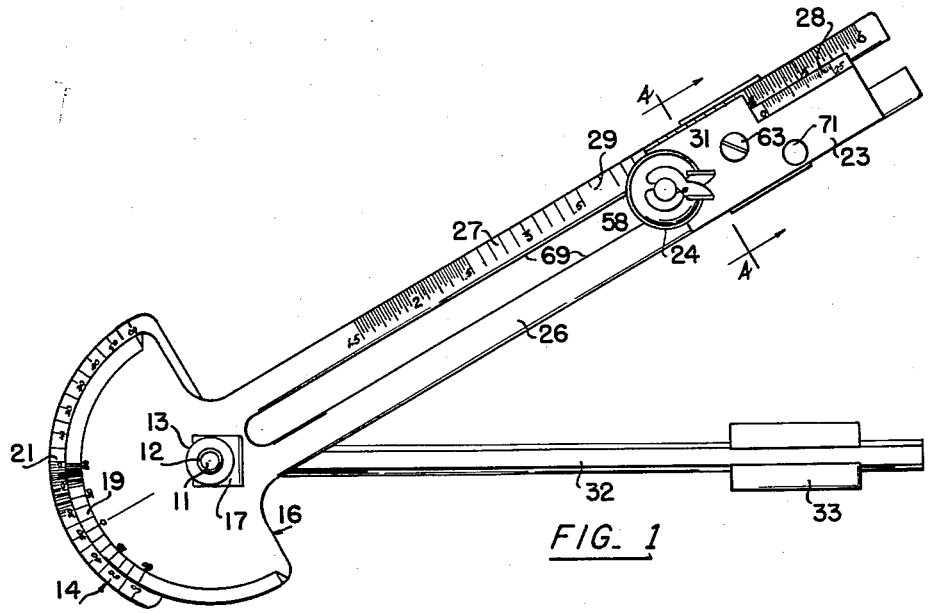
Figure 4:
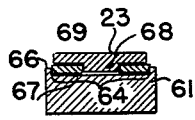
Figure 2:
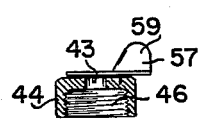
Figure 2:
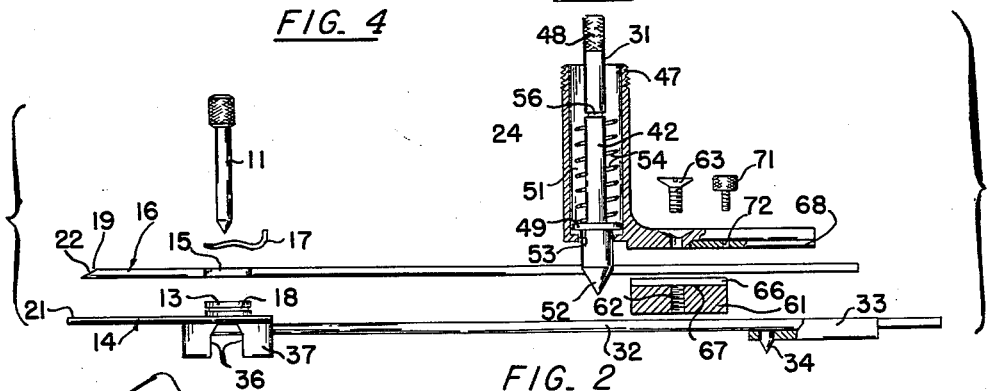
Figure 3:
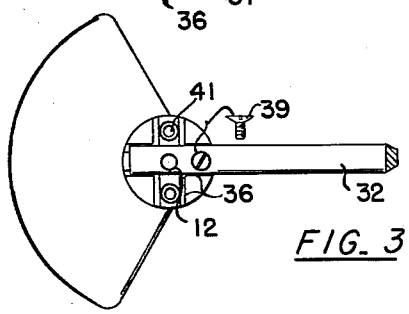

Further objects and advantages of the present invention will be apparent from the appended description and drawings, in which FIG. 1 is a top plan view in partial section and in partial dotted outline showing the overall features and manner of usage of the device, FIG. 2 is an elevational exploded view representation of some of the separate parts of the device, FIG. 3 is a bottom view of the angle base plate illustrating the method of attachment of a removable slide bar, and FIG. 4 is a cross-sectional elevation along the line 4—4 in FIG. 1.

Briefly stated, this invention provides a vernier calibrated angle and distance layout instrument that may be used in machine work or in similar activities to establish, locate and mark desired points for the purpose of locating drill openings or turning centers with relation to an initially positioned point of reference and with further relation to a reference base line derived from such single reference point. Through provision of vernier readings for the angle of turn away from the base reference line and through the further provision of vernier calibrations locating the distance from the initial point of reference, multiple work points may be established at various angles and distances from the base reference line and point. The instrument incorporates center punch locating devices as well as accurate guide means therefor so that depressed center points may be made at the accurately located positions. Mechanically, the device includes an angle base plate which may be affixed to a removable type slide bar to establish or hold a base reference line. A turning plate having vernier angle calibrations and distance markings thereon is provided to be mounted on the base plate and slide bar assembly for angular movement with respect thereto. Further, a centering plunger pin is mounted on the turning plate for reciprocal movement therealong, and all such elements are cooperatively useful each with each so that the center pin through the turn and base plates and the plunger pin will be held in true vertical positions at the measured distances apart so that the striking of the plunger will effect the accurate marking of the layout work piece.

The detailed features of the invention will be better understood after reference to the accompanying figures, in FIG. 1 of which it will be seen that a center pin 11 is adapted to be received in the internal opening 12 drilled in a stub extension 13 which is in position raised above an angle base plate 14. A turning plate 16 having a central opening 15 is mounted for rotating movement about the stub extension 13 and is held in position on the base plate 14 by means of a spring clip 17 which engages a groove 18 in the side walls of the stub extension 13 to hold the base plate 14 and turn plate 16 in intimate contact each with each.

Because of the arrangement of the parts described, the turn plate 16 effectively rotates about the stub extension 13 and, in fact, about the concentric center pin 11 so that the vernier markings 19 on the turn plate 16 will be brought into adjusted positions with respect to the angle markings 21 on the base plate 14. By means of this arrangement and further by means of the angularly disposed face 22 on the turn plate 16, extremely accurate alignments of the markings 19 and 21 are possible.

In order that the angle turning functions of the device may be used, it is necessary that a base reference line be established. Accurate positioning of the base reference line and the further accurate location of reference points therealong is initially made by first establishing a punch mark, center point location through use of the centering pin 11. Next, the turning plate is aligned along the desired base reference line, and thereafter the vernier slide 23 with attached plunger barrel 24 is moved outwardly along the length of the turning plate 16. The vernier slide 23 and the affixed plunger barrel 24 are moved outwardly along the separate tines 26 and 27 of the turning plate 16 until the vernier markings 28 on the vernier slide 23 are properly aligned with the distance markings 29 on the tine 27 of the turn plate 16 to indicate the desired distance from the center pin 11. When the proper position adjustment has been made, the plunger barrel 24 will be disposed directly above the desired work point, and the plunger pin 31 may be released to strike the work piece and to provide a center punch marking on the base reference line and at the desired distance away from the center pin 11.

Once the base reference line and the points of reference thereon have been established, it is most convenient to thereafter locate the removable slide bar 32 and its associated slide gib 33 along this base reference line. As before, the center pin 11 is maintained at the center of turning movements while the plunger pin 31 which has preferably been retracted into the plunger barrel 24 is moved away. The locator pin 34 on the slide gib 33 is next moved into contact with the previously struck base line work point on the layout piece. With the center pin 11, the slide bar 32 and the locator pin 34 establishing and defining a base reference line, the turning plate 16 may be rotated to various desired angles away from the base reference line. For each angle position additional turn centers or drill centers may be located through actuation of the vernier slide 23 and subsequently of the plunger pin 31.

Because of the fact that the base plate 14 only provides for angle measurements up to 60° on both sides of a center location, it may become necessary to move the slide bar 32 to alternate positions with respect to the base plate 14. This function is relatively simple, and it merely requires the repositioning of the slide bar 32 in the cross slots 36 of the base stand 37 which holds the base plate 14 in raised elevated position. Since the cross slots 36, which have an upper portion of trapezoidal cross-section adapted to receive the trapezoidal shaped slide bar 32, are at right angles each to each, removal of the set screw 39 from the threaded opening 41 will permit removal of the slide bar 32. After the repositioning of the slide bar 32 in another cross slot 36, the set screw 39 may be retightened in the new position to securely and accurately hold the base plate 14 and slide bar 32 together. This arrangement makes it possible to mutually engage the slide bar 32 and base plate 14 each to each in any 90° angular position.

Once these elements have been engaged each to each and once the center pin 11 and locator pin 34 are positioned along the base reference line at the desired distances apart, the turning plate 16 can again be rotated until the desired angular relationship is derived. As before, the vernier slide 23 and plunger barrel 24 are moved in or out to a desired position so the plunger pin 31 may be released to locate and mark the desired reference point on the work piece. In similar manner, many additional work points may be established either along the same angular line defined by the turning plate 16 or at separate angles away from the base reference line as established by the base plate 14, the slide bar 32 and the locator pin 34.

In addition to the parts already named and described, it will be apparent from the drawings that other parts and assemblies materially contribute to the utility and accuracy of this device. The detailed structure of the plunger barrel 24 and its associated parts and interworking of such parts will be best understood with reference to FIG. 2. Here, it is seen that the plunger pin 31 is mounted for reciprocal movement inside of the plunger barrel 24. As shown, the main shank 42 of the plunger pin 31 is of reduced diameter providing a close fit through the opening 43 in the barrel cap 44. With this arrangement, when the parts are assembled so that the internal threads 46 in the barrel cap 44 are engaged with the external threads 47 on the plunger barrel 24, the knurled end 48 of plunger pin 31 will extend above the barrel cap 44. The close fit between pin 31 and the opening 43 and a similar close fit between the shoulder 49 and the inner cylindrical surface 51 of the barrel 24 will keep the plunger pin 31 in true vertical position. A further close fit between the enlarged striking point 52 and the opening 53 at the bottom of the plunger barrel 24 likewise helps to maintain this vertical alignment.

In order to regulate the depth of the center point marking made by the striking point 52, it has been found beneficial to provide accurate means for regulating the force applied to the plunger pin 31. In order to accomplish this result, a plunger spring 54 is positioned within the plunger barrel 24 to act between the shoulder 49 and the barrel cap 44. In operation the plunger pin is pulled upwardly out of the plunger barrel 24 until the groove 56 may be engaged by the release clip 57. Since the release clip 57 is preferably of a scissors type arrangement having spring means tending to hold the separate finger shaped arms 58 in engagement with the groove 56, the plunger pin 31 will be held in its retracted position above the cap 44 until finger pressure is applied to the wing plates 59 to expand the finger arms and release the engagement with the groove 56. Upon release, the spring 54 will drive the plunger pin downwardly in a true vertical path until the striking point comes into engagement with the layout work piece to mark the further desired point of reference on such work piece.

In order to assure the true vertical disposition for the plunger barrel 24, or, more accurately, to maintain the plunger barrel 24 in position normal to the work surface, it is necessary that the turn plate 16 be maintained parallel to such work piece. For this reason, a keeper slide 61 is provided for sliding contact with the separate tines 26 and 27 of the turn plate 16 together with the vernier slide 23. In structure, this keeper slide 61 is a simple block type support unit having a center drilled and tapped opening 62 adapted to receive a flat head screw 63 and further having a wide flange groove 64 of just sufficient width to engage the outer edges of the tines 26 and 27.

The flanges 66 of the keeper slide 61 are raised above the base surface 67 of the described groove so that such flanges 66 will be in the described contact position with relation to the outer edges of the tines 26 and 27. When the parts are properly assembled, the dropped center guide rail 68 of the vernier slide 23 extends downwardly through the center slot 69 between the tines 26 and 27 of turn plate 16 and into engagement with the base surface 67 of the keeper slide 61. Preferably, the relative spacing and thickness of the described elements is to be such that when the flat head screw 63 is tightened, a slight friction will be maintained between these sliding pieces so that the vernier slide will have a tendency to stay in adjusted positions. In order to maintain the desired parallel relationship for the turning plate 16, the distance between the bottom of the keeper slide 61 and the base surface 67 should be equal to the total height of the base stand 37 and the thickness of the base plate 14. This relation is shown in FIG. 4.

In addition to the described friction fit between the keeper slide 61, the tines and center slot of turn plate 16 and the elements of the vernier slide 63, the inventor further provides a thumb screw 71, which is adapted to be received in the threaded opening 72 in the vernier slide 63. Tightening of this thumb screw 71 will move the end of the screw down into engagement with the top surface of the tine 26 to positively hold the vernier slide in its intended position.

Because this instrument is intended for use in connection with extremely accurate work, the respective fittings of separate pieces and the tolerances for all openings and parts should be quite accurate. In usage, it is expected that the points on the center pin 11, the plunger pin 31 and the locator pin 34 may become worn. The center pin and plunger pin may be accurately resharpened several times without destroying the accuracy of the instrument. The locator pin 34, however, is preferably positioned in the slide gib 33 by a press fit so that substitute pins may be interchangeably installed after excessive wear. A main feature which contributes to the accuracy of this instrument is the use of a spring actuated plunger pin 31. With the proper weight of spring each mark made by the plunger pin will be uniform and regular. Further features of the instrument likewise assure accuracy of adjustment and alignment throughout the useful life of such instrument.

The described vernier apparatus is provided so that readings of high accuracy may be obtained. The distance measuring verniers are of a type intended to provide accuracies up to one-thousandth of an inch. This result is accomplished by dividing each tenth of an inch on the distance marking scale 29 into four segments and by likewise dividing a distance of six-tenths of an inch on the vernier slide into twenty-five divisions. In the angle readings an accuracy of two minutes is obtained by dividing an arc of twenty-nine degrees on the vernier marking scale 19 into thirty divisions numbered from zero to sixty minutes. With this arrangement accurate alignment of a mark on the vernier scale 19 with a degree marking on the angle scale 21 will provide two-minute readings.

While a separate embodiment of the invention has been shown and described, it will be apparent that the features of this invention are adaptable to various modifications and changes. All such modifications as come within the scope of the hereunto appended claims are considered to be a part of this invention.

I claim:

1. A vernier calibrated angle and distance layout instrument for locating and marking centers on a work piece comprising an angle base plate, a stub extension above said base plate, a base stand below said base plate for holding said base plate in elevated position above the work piece, said base plate, stub extension and base stand having an opening therethrough disposed normal to said elements, said base stand further providing cross slots intersecting at said opening and at right angles each to each, a removable slide bar adapted for positioning and retention selectively in either of said cross slots, a slide gib on said slide bar having a cut groove thereon for reciprocally engaging said slide bar, a locator pin on said slide gib, a center pin for reciprocal engagement in said opening whereby said pins are useful to locate and hold a base reference line, a turnplate having a pivot opening therethrough for operative positioning above said base plate and about said stub extension, tines on said turnplate, a vernier slide adapted for reciprocal movement along said tines, a plunger barrel disposed on an axis normal to said turnplate and vernier slide and attached to said vernier slide for movement therewith, a plunger pin in said barrel for reciprocal movement along the axis of said barrel, and vernier index markings on said vernier slide and turnplate tines for indicating the distance between said center and plunger pins.

2. A vernier calibrated angle and distance layout instrument for locating and marking centers on a work piece comprising an angle base plate, a stub extension above said base plate, a base stand below said base plate for holding said base plate in elevated position above the work piece, said base plate, stub extension and base stand having an opening therethrough disposed normal to said elements, said base stand further providing cross slots intersecting at said opening and at right angles each to each, a removable slide bar adapted for positioning and retention selectively in either of said cross slots, a slide gib on said slide bar having a cut groove thereon for reciprocally engaging said slide bar, a locator pin on said slide gib, a center pin for reciprocal engagement in said opening whereby said pins are useful to locate and hold a base reference line, a turnplate having a pivot opening therethrough for operative positioning above said base plate and about said stub extension, tines on said turnplate, a vernier slide adapted for reciprocal movement along said tines, a plunger barrel disposed on an axis normal to said turnplate and vernier slide and attached to said vernier slide for movement therewith, a plunger pin in said barrel for reciprocal movement along the axis of said barrel, and vernier angle markings on said base and turn plates for indicating the angular relation between said base reference line and the plunger pin.

3. A vernier calibrated angle and distance layout instrument for locating and marking centers on a work piece comprising an angle base plate, a stub extension above said base plate, a base stand below said base plate for holding said base plate in elevated position above the work piece, said base plate, stub extension and base stand having an opening therethrough disposed normal to said elements, said base stand further providing cross slots intersecting at said opening and at right angles each to each, a removable slide bar adapted for positioning and retention selectively in either of said cross slots, a slide gib on said slide bar having a cut groove thereon for reciprocally engaging said slide bar, a locator pin on said slide gib, a center pin for reciprocal engagement in said opening whereby said pins are useful to locate and hold a base reference line, a turnplate having a pivot opening therethrough for operative positioning above said base plate and about said stub extension, tines on said turnplate, a vernier slide adapted for reciprocal movement along said tines, a plunger barrel disposed on an axis normal to said turnplate and vernier slide and attached to said vernier slide for movement therewith, a plunger pin in said barrel for reciprocal movement along the axis of said barrel, vernier index markings on said vernier slide and turnplate tines for indicating the distance between said center and plunger pins, and vernier angle markings on said base and turn plates for indicating the angular relation between said base reference line and the plunger pin.

4. A vernier calibrated angle and distance layout instrument for locating and marking centers on a work piece comprising an angle base plate, a stub extension above said base plate, a base stand below said base plate for holding said base plate in elevated position above the work piece, said base plate, stub extension and base stand having an opening therethrough disposed normal to said elements, a removable slide bar adapted for selective engagement with said base stand for extension outwardly therefrom, a slide gib on said slide bar having a cut groove thereon for reciprocally engaging said slide bar, a locator pin on said slide gib, a center pin for reciprocal engagement in said opening whereby said pins are useful to locate and hold a base reference line, a turnplate having a pivot opening therethrough for operative positioning above said base plate and about said stub extension, tines on said turnplate, a vernier slide adapted for reciprocal movement along said tines, a plunger barrel disposed on an axis normal to said turnplate and vernier slide and attached to said vernier slide for movement therewith, a plunger pin in said barrel for reciprocal movement along the axis of said barrel, and vernier index markings on said vernier slide and turnplate tines for indicating the distance between said center and plunger pins.

5. A vernier calibrated angle and distance layout instrument for locating and marking centers on a work piece comprising an angle base plate, a stub extension above said base plate, a base stand below said base plate for holding said base plate in elevated position above the work piece, said base plate, stub extension and base stand having an opening therethrough disposed normal to said elements, said base stand further providing cross slots intersecting at said opening and at right angles each to each, a removable slide bar adapted for positioning and retention selectively in either of said cross slots, a slide gib on said slide bar having a cut groove thereon for reciprocally engaging said slide bar, a locator pin on said slide gib, a center pin for reciprocal engagement in said opening whereby said pins are useful to locate and hold a base reference line, a turnplate having a pivot opening therethrough for operative positioning above said base plate and about said stub extension, tines on said turnplate, a vernier slide adapted for reciprocal movement along said tines, a plunger barrel disposed on an axis normal to said turnplate and vernier slide and attached to said vernier slide for movement therewith, a plunger pin in said barrel for reciprocal movement along the axis of said barrel, vernier index markings on said vernier slide and turnplate tines for indicating the distance between said center and plunger pins, and spring means in said plunger barrel and acting against said plunger pin to drive said pin downwardly against the work piece to establish a center mark at the desired point upon release of said plunger pin.

References Cited in the file of this patent

UNITED STATES PATENTS

| | | |
|---|---|---|
| 2,083,490 | Baker | June 8, 1937 |
| 2,569,349 | Smith | Sept. 25, 1951 |
| 2,708,972 | Park | May 24, 1955 |

FOREIGN PATENTS

| | | |
|---|---|---|
| 337,840 | Great Britain | Nov. 13, 1930 |